US010283744B2

(12) United States Patent
Seo et al.

(10) Patent No.: US 10,283,744 B2
(45) Date of Patent: May 7, 2019

(54) BATTERY MODULE AND BATTERY PACK (71) Applicant: LG CHEM, LTD., Seoul (KR)

(72) Inventors: Jaihyun Seo, Daejeon (KR); Seong Tae Kim, Daejeon (KR); Jin Kyu Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 130 days.

(21) Appl. No.: 15/314,366

(22) PCT Filed: May 28, 2015

(86) PCT No.: PCT/KR2015/005348
§ 371 (c)(1),
(2) Date: Nov. 28, 2016

(87) PCT Pub. No.: WO2015/186923
PCT Pub. Date: Dec. 10, 2015

(65) Prior Publication Data
US 2017/0200925 A1 Jul. 13, 2017

(30) Foreign Application Priority Data
Jun. 2, 2014 (KR) .................. 10-2014-0066757

(51) Int. Cl.
H01M 2/10 (2006.01)
H01M 2/02 (2006.01)
(Continued)

(52) U.S. Cl.
CPC ....... H01M 2/1077 (2013.01); H01M 2/0287 (2013.01); H01M 2/1061 (2013.01); F16B 35/00 (2013.01); F16B 37/125 (2013.01)

(58) Field of Classification Search
CPC .................. H01M 2/0287; H01M 2/1077
(Continued)

(56) References Cited
U.S. PATENT DOCUMENTS
8,932,749 B2 1/2015 Lim
9,236,587 B2 1/2016 Lee et al.
(Continued)

FOREIGN PATENT DOCUMENTS
JP 2006147546 A 6/2006
JP 2013-045765 A 3/2013
(Continued)

OTHER PUBLICATIONS
International Search Report and Written Opinion dated Aug. 25, 2015 for Application No. PCT/KR2015/005348.
(Continued)

Primary Examiner — James M Erwin
(74) Attorney, Agent, or Firm — Morgan, Lewis & Bockius LLP (57) ABSTRACT
Disclosed herein are a battery module and a battery pack. The battery module, having a plurality of battery cells, includes a unit module stack configured to have a structure in which a plurality of unit modules, each of which has a structure in which the battery cells are mounted to a cartridge, are stacked in a vertical direction on the basis of a ground, an upper end plate and a lower end plate for supporting an upper end and a lower end of the unit module stack, respectively, the upper end plate being provided with first fastening holes, the lower end plate being provided with second fastening holes, and a module housing provided with third fastening holes communicating with the second fastening holes, wherein first fastening members and second fastening members are inserted and fastened into the first fastening holes, the second fastening holes, and the third fastening holes.

14 Claims, 8 Drawing Sheets (51) Int. Cl.
*F16B 35/00* (2006.01)
*F16B 37/12* (2006.01)

(58) Field of Classification Search
USPC .......................................................... 429/153
See application file for complete search history.

(56) References Cited

U.S. PATENT DOCUMENTS

| | | |
|---|---|---|
| 9,337,458 B2 | 5/2016 | Kim |
| 2008/0248377 A1 | 10/2008 | Hashida |
| 2013/0149577 A1* | 6/2013 | Lee .................... B60L 11/1879 |
| | | 429/90 |

FOREIGN PATENT DOCUMENTS

| | | |
|---|---|---|
| JP | 2014157721 A | 8/2014 |
| KR | 10-2012-0016350 A | 2/2012 |
| KR | 10-2012-0074421 A | 7/2012 |
| KR | 10-2012-0074425 A | 7/2012 |
| KR | 10-2013-0011740 A | 1/2013 |
| WO | WO-2012023731 A2 * | 2/2012 .......... B60L 11/1879 |

OTHER PUBLICATIONS

Office Action dated Aug. 6, 2018, from the Japanese Patent Office in related Japanese 2016-569595.

* cited by examiner

BATTERY MODULE AND BATTERY PACK

The present application claims priority under 35 U.S.C. § 119 to Korean Patent Application Nos. 10-2014-0066757 filed on Jun. 2, 2014, and under 35 U.S.C. § 365 to PCT Application No. PCT/KR2015/005348 filed on May 28, 2015, the disclosures of which are incorporated herein by reference.

TECHNICAL FIELD

The present invention relates to a battery module and a battery pack including the same.

BACKGROUND ART

In recent years, a secondary battery, which can be charged and discharged, has been widely used as an energy source for wireless mobile devices or an auxiliary power device. In addition, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

Small-sized mobile devices use one or several battery cells for each device. On the other hand, middle or large-sized devices, such as auxiliary power devices or vehicles, use a battery module having a plurality of battery cells electrically connected to each other because high output and large capacity are necessary for the middle or large-sized devices.

Preferably, the battery module is manufactured so as to have as small a size and weight as possible. For this reason, a prismatic battery or a pouch-shaped battery, which can be stacked with high integration and has a small weight to capacity ratio, is usually used as a battery cell (unit battery) of the middle or large-sized battery module. In particular, much interest is currently focused on the pouch-shaped battery, which uses an aluminum laminate sheet as a sheathing member, because the pouch-shaped battery is lightweight, the manufacturing cost of the pouch-shaped battery is low, and it is easy to modify the shape of the pouch-shaped battery.

In general, a high-output, large-capacity battery pack including a plurality of battery modules is configured to have a structure in which a plurality of battery cells or battery modules is stacked while being adjacent to each other, and the battery cell stack or the battery module stack is fixed to a base plate. In this structure, long bolts and additional fixing brackets connected to frames of the battery modules and the base plate in a surface contact fashion are used as means for fixing the battery modules to the base plate.

In the fastening structure using the long bolts and the fixing brackets, however, the battery cells may move in a direction in which the battery cells are stacked or a direction perpendicular to the ground when excessive impact is applied to the battery pack with the result that safety of the battery pack is lowered. In addition, the internal space of the battery pack is decreased, and the weight of the battery pack is increased, due to the use of the additional fixing brackets. Furthermore, a process of fastening the fixing brackets increases total process time.

Consequently, there is a high necessity for a battery module having a novel assembly structure that is capable of solving the above problems.

DISCLOSURE

Technical Problem

Therefore, the present invention has been made to solve the above problems and other technical problems that have yet to be resolved.

It is an object of the present invention to provide a battery pack configured such that a fixing structure of battery modules is securely maintained even when external impact is applied to the battery pack, and no additional structure for fixing the battery modules in the battery pack is needed, whereby the internal space of the battery pack is increased.

It is another object of the present invention to provide a battery pack configured such that battery modules are easily separated from each other and coupled to each other at the time of assembling and replacing the battery pack, whereby total process time is reduced.

Technical Solution

In accordance with one aspect of the present invention, the above and other objects can be accomplished by the provision of a battery module having a plurality of battery cells, the battery module including a unit module stack configured to have a structure in which a plurality of unit modules, each of which has a structure in which the battery cells are mounted to a cartridge, are stacked in a vertical direction on the basis of a ground, the cartridge being provided with one or more through holes, an upper end plate and a lower end plate for supporting an upper end and a lower end of the unit module stack, respectively, the upper end plate being provided with first fastening holes communicating with the through holes, the lower end plate being provided with second fastening holes communicating with the through holes, a module housing for surrounding at least one lateral side of the unit module stack mounted on the lower end plate and a bottom of the lower end plate, the module housing being provided with third fastening holes communicating with the second fastening holes, first fastening members having hollow parts, through which second fastening members are inserted, formed along a central axis thereof, the first fastening members being coupled into the second fastening holes through the first fastening holes and the through holes, and the second fastening members coupled into the third fastening holes through the hollow parts of the first fastening members.

In the battery pack according to the present invention, the unit module stack including the unit modules and the upper and lower end plates coupled to the unit module stack for supporting the upper and lower ends of the unit module stack, respectively, are fixed to the module housing using the first and second fastening members each having the specific structure. Consequently, the fixing structure of the battery modules is securely maintained even when external impact is applied to the battery pack, and no additional member for mounting and fixing the battery modules is needed, whereby the internal space of the battery pack is increased.

In a concrete example, each of the first fastening members may include a head having an outer diameter greater than an inner diameter of a corresponding one of the first fastening holes, a fastening bar inserted through a corresponding one of the first fastening holes and a corresponding one of the through holes, and a first fastening end having a screw thread formed at an outer surface thereof, the screw thread being coupled into a corresponding one of the second fastening holes, and a hollow part may be formed through the head, the fastening bar, and the first fastening end along central axes of the head, the fastening bar, and the first fastening end. Each of the second fastening members may include a head having an outer diameter greater than an inner diameter of the hollow part of the first fastening member, an insertion bar inserted through the hollow part of the first fastening member, and a second fastening end protruding from a lower end of the hollow part of the first fastening member, the second fastening end having a screw thread formed at an outer surface thereof, the screw thread being coupled into a corresponding one of the third fastening holes.

The head of each of the first fastening members may be provided with a depressed part, in which the head of a corresponding one of the second fastening members is located, and the fastening bar may be provided at an inside of an upper end thereof with a wrenching bolt structure.

In the above structure, the depressed part may be depressed by at least a height of the head of each of the second fastening members.

In addition, the head of each of the second fastening members may be provided with a wrenching bolt structure.

In a concrete example, the cartridges, the upper end plate, and the lower end plate may be coupled to one another by inserting the first fastening members therethrough and then coupled to the module housing by fastening the second fastening members into the third fastening holes through the hollow parts.

In the above structure, the second fastening holes and the third fastening holes may each be provided with a screw structure, into which the first fastening end of a corresponding one of the first fastening members and the second fastening end of a corresponding one of the second fastening members are threadedly engaged.

Meanwhile, according to the present invention, the first fastening members and the second fastening members may each be made of a metal material, and the upper end plate and the lower end plate may each be made of a metal material. However, the present invention is not limited thereto.

In a concrete example, the cartridge may be configured to have a rectangular structure corresponding to the battery cells such that the battery cells are mounted to the cartridge and may be provided at four corners thereof with through holes, through which the first fastening members are inserted to fix the unit module stack.

Each of the battery cells may be, for example, a pouch-shaped battery cell having an electrode assembly mounted in a battery case made of a laminate sheet comprising a resin layer and a metal layer.

Specifically, each of the battery cells may be a pouch-shaped battery cell configured to have a structure in which an electrode assembly of a positive electrode/separator/negative electrode structure is contained in a battery case together with an electrolyte in a sealed state. For example, each of the battery cells may be a plate-shaped battery cell configured to have an approximately hexahedral structure having a small thickness to width ratio. In general, the pouch-shaped battery cell may include a pouch-shaped battery case. The battery case is configured to have a laminate sheet structure in which an outer coating layer made of a polymer resin exhibiting high durability, a barrier layer made of a metal material blocking moisture or air, and an inner sealant layer made of a thermally bondable polymer resin are sequentially stacked.

The battery case of the pouch-shaped battery cell may be configured to have various structures. For example, the case of the pouch-shaped battery cell may be configured to have a structure in which an electrode assembly is received in a receiving part formed at an upper inner surface and/or a lower inner surface of a two-unit member, and the upper and lower contact regions of the outer edge of the battery case are sealed by thermal bonding. The pouch-shaped battery cell with the above-stated construction is disclosed in PCT International Application No. PCT/KR2004/003312, which has been filed in the name of the applicant of the present patent application. The disclosure of the above-mentioned patent application is hereby incorporated by reference as if fully set forth herein. On the other hand, the battery case may be configured to have a structure in which an electrode assembly is received in a receiving part formed at an upper inner surface and/or a lower inner surface of a one-unit member and the upper and lower contact regions of the outer edge of the battery case are sealed by thermal bonding.

In a concrete example, the laminate sheet may be configured to have a structure comprising a thermally bondable inner resin layer, an isolation metal layer, and an outer resin layer exhibiting high durability.

In accordance with another aspect of the present invention, there is provided a middle or large-sized battery pack of high output and large capacity including the battery module with the above-stated construction as a unit body. The middle or large-sized battery pack may be configured to have a structure in which a various number of battery modules are mounted while being electrically connected to each other based on required capacity and output.

In accordance with a further aspect of the present invention, there is provided a device including the battery pack with the above-stated construction. The device may be any one selected from among an electric vehicle, a hybrid electric vehicle, a plug-in hybrid electric vehicle, and a power storage device. However, the present invention is not limited thereto.

The structure and manufacturing method of the device are well known in the art to which the present invention pertains and, therefore, a detailed description thereof will be omitted.

Effects of the Invention

As is apparent from the above description, a battery module according to the present invention uses fastening members each configured to have a bushing fastening structure. Consequently, the present invention has the effect of securely maintaining a fixing structure of the battery module even when external impact, such as vibration or dropping, occurs, thereby improving safety of the battery module.

In addition, additional means, such as fixing brackets, for fixing the battery module to a base plate is omitted. Consequently, the present invention has the effect of increasing an internal space of a battery pack.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
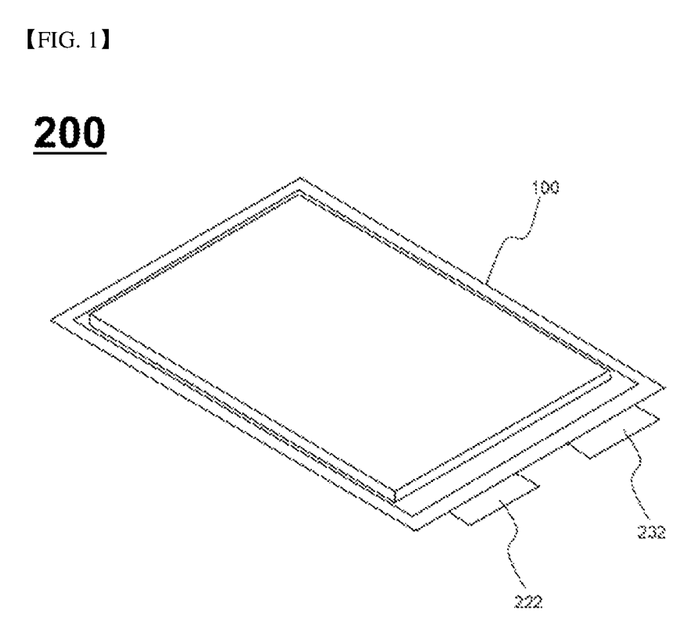
FIG. 1 is a perspective view showing a battery cell, which will be mounted in a battery module.
Figure 2:
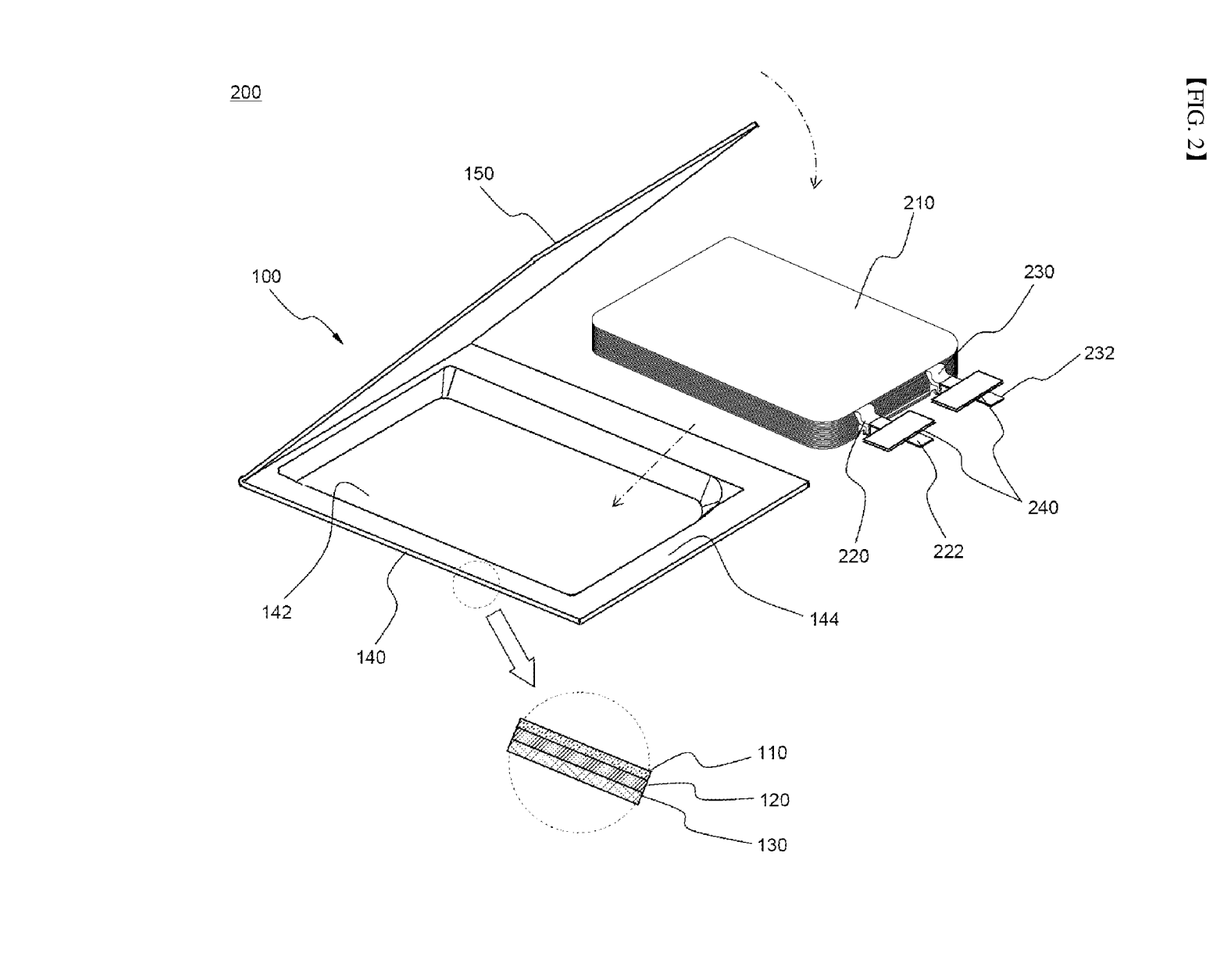
FIG. 2 is an exploded typical view showing the battery cell of FIG. 1.

FIG. 1 is a perspective view typically showing an exemplary battery cell, which will be mounted in a unit module of the present invention, and FIG. 2 is an exploded typical view showing the battery cell of FIG. 1.

Referring to these figures, a plate-shaped battery cell 200 is configured to have a structure in which an electrode assembly, including positive electrodes, negative electrodes, and separators disposed respectively between the positive electrodes and the negative electrodes, is mounted in a pouch-shaped battery case 100 in a sealed state such that two electrode terminals 222 and 232 electrically connected to positive electrode and negative electrode tabs 220 and 230 of the electrode assembly are exposed outward.

The battery case 100 includes a case body 140 having a depressed receiving part 142, in which the electrode assembly 210 is located, and a cover 150 integrally connected to the case body 140.

The positive electrode tabs 220 and the negative electrode tabs 230 of the electrode assembly 210, which has a stacked type structure or a stacked/folded type structure, are respectively coupled to the electrode terminals 222 and 232 by welding. In addition, insulative films 240 are attached to the top and bottom of each of the electrode terminals 222 and 232 in order to prevent the occurrence of a short circuit between a thermal welding device and the electrode terminals 222 and 232 and to secure sealing between the electrode terminals 222 and 232 and the battery case 100 when a surplus part 144 of the case body 140 and the cover 150 are thermally welded to each other using the thermal welding device.

The case body 140 and the cover 150 each include an outer resin layer 110, an isolation metal layer 120, and an inner resin layer 130. The inner resin layer 130 of the case body 140 and the inner resin layer 130 of the cover 150 are fixed to each other in tight contact due to heat and pressure applied to the outer surface of the case body 140 and the outer surface of the cover 150 from the thermal welding device (not shown).

The surplus part 144 of the case body 140 and the cover 150 are thermally welded to each other in a state in which the electrode assembly 210, which is impregnated with an electrolyte, is located in the receiving part 142. As a result, a sealed portion is formed at the battery case 100.

Figure 3:
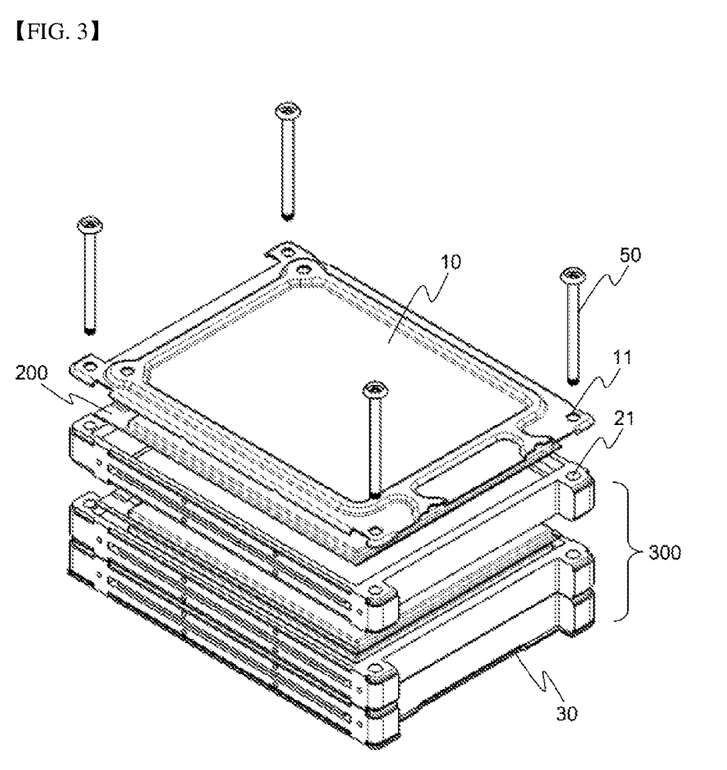
FIG. 3 is an exploded perspective view showing a unit module stack according to an embodiment of the present invention.
Figure 4:
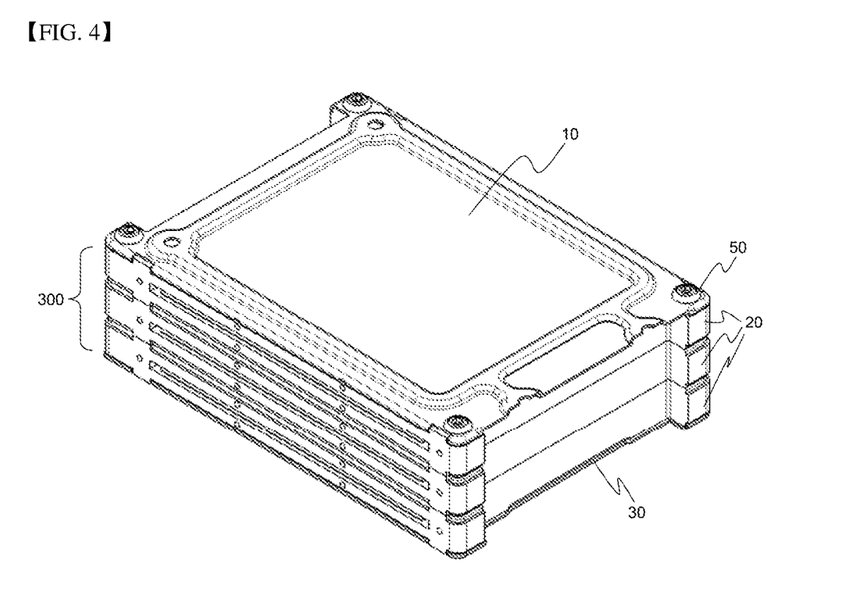
FIG. 4 is a perspective view showing the unit module stack of FIG. 3.
Figure 5:
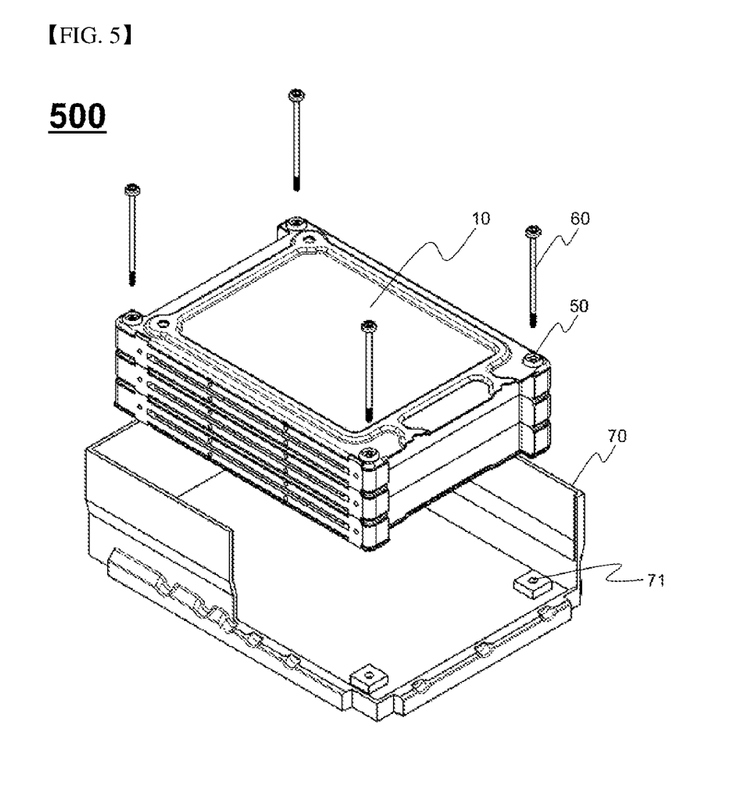
FIG. 5 is an exploded perspective view showing a battery module according to an embodiment of the present invention.
Figure 6:
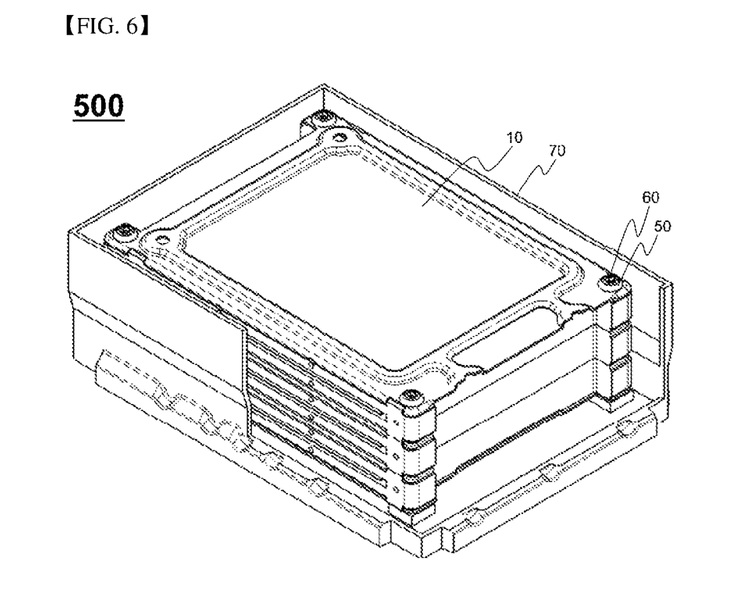
FIG. 6 is a perspective view showing the battery module of FIG. 5.

FIG. 3 is an exploded perspective view showing a unit module stack according to an embodiment of the present invention, FIG. 4 is a perspective view typically showing the unit module stack of FIG. 3, FIG. 5 is an exploded perspective view showing a battery module according to an embodiment of the present invention, and FIG. 6 is a perspective view typically showing the battery module of FIG. 5.

Referring to these figures, a battery module 500 according to the present invention includes a unit module stack 300 including a plurality of cartridges 20 stacked in a vertical direction on the basis of the ground in a state in which battery cells 200 are mounted to each of the cartridges 20, an upper end plate 10 and a lower end plate 30 for supporting the uppermost one and the lowermost one of the cartridges 20, respectively, and a module housing 70 having a structure for surrounding lateral sides of the unit module stack 300 mounted on the lower end plate 30 and the bottom of the lower end plate 30.

Each of the cartridges 20 is provided at four corners thereof with through holes 21. The upper end plate 10 is provided at regions thereof corresponding to the through holes 21 with first fastening holes 11 such that the first fastening holes 11 communicate with the respective through holes 21. In the same manner, the lower end plate 30 is provided at regions thereof corresponding to the through holes 21 with second fastening holes (not shown) such that the second fastening holes communicate with the respective through holes 21.

The module housing 70 is provided at regions thereof corresponding to the second fastening holes with third fastening holes 71 such that the third fastening holes 71 communicate with the respective second fastening holes. The second fastening holes and the third fastening holes 71 each are provided at an inner circumference thereof with a screw structure (not shown), into which a first fastening end 54 (see FIG. 7) and a second fastening end 63 (see FIG. 7) formed at a first fastening member 50 and a second fastening member 60 are threadedly engaged. Consequently, the first fastening end 54 of the first fastening member 50 is coupled into each of the second fastening holes, and the second fastening end 63 of the second fastening member 60 is easily coupled into each of the third fastening holes 71 of the module housing 70.

Figure 7:
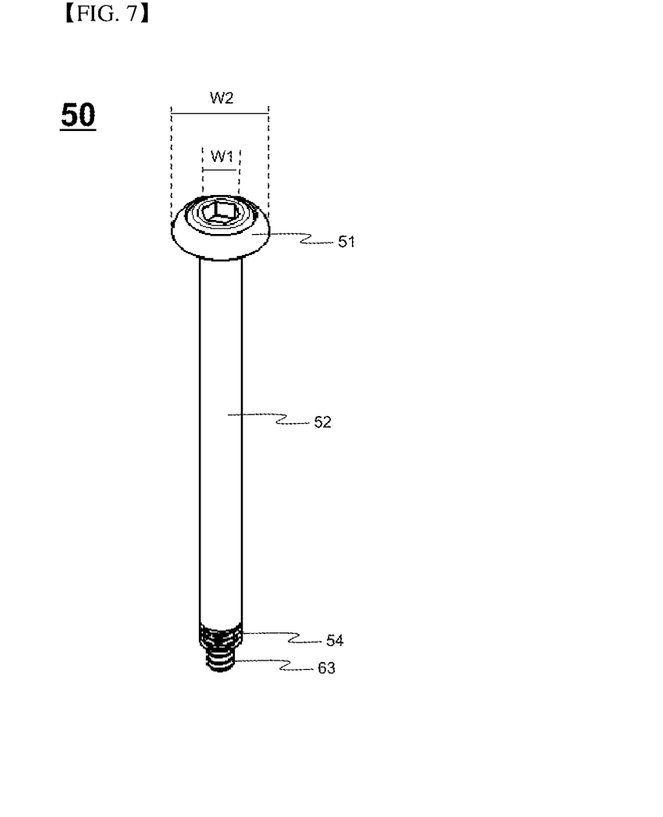
FIG. 7 is a perspective view showing a fastening member according to an embodiment of the present invention.
Figure 8:
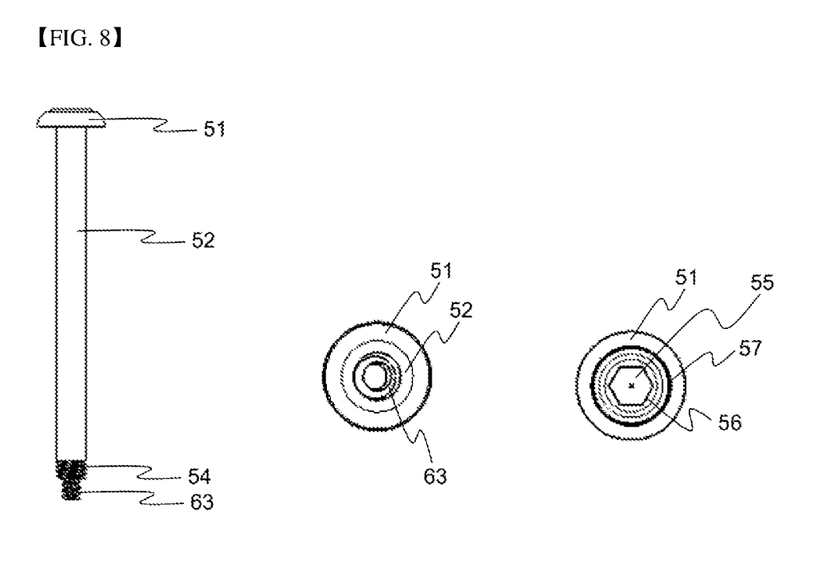
FIG. 8 is a side view, a plan view, and a bottom view showing the fastening member of FIG. 7.
Figure 9:
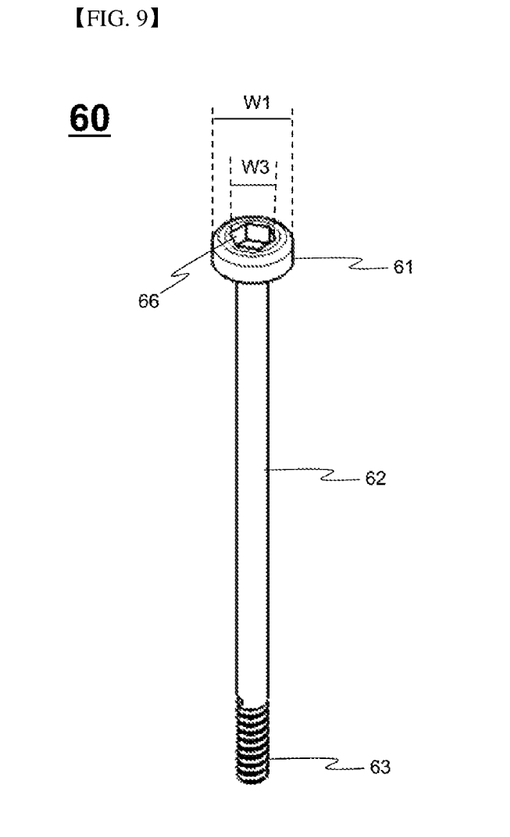
FIG. 9 is a perspective view showing a second fastening member according to an embodiment of the present invention.

FIG. 7 is a perspective view showing a fastening member according to an embodiment of the present invention, FIG. 8 is a side view, a plan view, and a bottom view typically showing the fastening member of FIG. 7, and FIG. 9 is a perspective view typically showing a second fastening member according to an embodiment of the present invention.

Referring to these figures together with FIGS. 1 to 6, a fastening member according to the present invention includes a first fastening member 50 and a second fastening member 60.

The first fastening member 50 includes a head 51 having an outer diameter W2 greater than an inner diameter W1, a fastening bar 52 inserted through each of the first fastening holes 11 and each of the through holes 21, and a first fastening end 54 having a screw thread formed at the outer surface thereof, the screw thread being coupled into each of the second fastening holes. In addition, a hollow part 55 is formed through the head, the fastening bar, and the first fastening end along central axes of the head, the fastening bar, and the first fastening end.

The head 51 of the first fastening member 50 is provided with a depressed part 57, in which a head 61 of the second fastening member 60 is stably located. The fastening bar 52 is provided at the inside of the upper end thereof with a wrenching bolt structure 56 for easy fastening.

In addition, the second fastening member 60 includes a head 61 having an outer diameter W1 greater than an inner diameter W3 of the hollow part 55 of the first fastening member 50, an insertion bar 62 inserted through the hollow part 55 of the first fastening member 50, and a second fastening end 63 protruding from the lower end of the hollow part 55, the second fastening end 63 having a screw thread formed at the outer surface thereof, the screw thread being coupled into each of the third fastening holes 71. The head 61 is provided with a wrenching bolt structure 66 for easy fastening.

Consequently, the first fastening members 50 are inserted into the second fastening holes (not shown) of the lower end plate 30 through the first fastening holes 11 of the upper end plate 10 and the through holes 21 of the cartridges 20. As a result, the unit module stack 300 including the cartridges 20, the upper end plate 10, and the lower end plate 30 are coupled to one another. Subsequently, the second fastening members 60 are inserted through the respective first fastening members 50 without interference with the respective first fastening members 50, and then the second fastening ends 63 of the second fastening members 60 are threadedly coupled into the third fastening holes 71 formed at the module hosing 70. As a result, the unit module stack 300, the upper end plate 10, the lower end plate 30, and the module housing 70 are securely fixed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery module having a plurality of battery cells, the battery module comprising:
 a unit module stack configured to have a structure in which a plurality of unit modules, each of which has a structure in which the battery cells are mounted to a cartridge, are stacked in a vertical direction on the basis of a ground, the cartridge being provided with one or more through holes;
 an upper end plate and a lower end plate for supporting an upper end and a lower end of the unit module stack, respectively, the upper end plate being provided with first fastening holes communicating with the through holes, the lower end plate being provided with second fastening holes communicating with the through holes;
 a module housing for surrounding at least one lateral side of the unit module stack mounted on the lower end plate and a bottom of the lower end plate, the module housing being provided with third fastening holes communicating with the second fastening holes;
 first fastening members having hollow parts, through which second fastening members are inserted, formed along a central axis thereof, the first fastening members being coupled into the second fastening holes through the first fastening holes and the through holes; and
 the second fastening members coupled into the third fastening holes through the hollow parts of the first fastening members,
 wherein each of the first fastening members comprises:
 a head having an outer diameter greater than an inner diameter of a corresponding one of the first fastening holes;
 a fastening bar inserted through a corresponding one of the first fastening holes and a corresponding one of the through holes; and
 a first fastening end having a screw thread formed at an outer surface thereof, the screw thread being coupled into a corresponding one of the second fastening holes, and
 a hollow part is formed through the head, the fastening bar, and the first fastening end along central axes of the head, the fastening bar, and the first fastening end.

2. The battery module according to claim 1, wherein each of the second fastening members comprises:
 a head having an outer diameter greater than an inner diameter of the hollow part of the first fastening member;
 an insertion bar inserted through the hollow part of the first fastening member; and
 a second fastening end protruding from a lower end of the hollow part of the first fastening member, the second fastening end having a screw thread formed at an outer surface thereof, the screw thread being coupled into a corresponding one of the third fastening holes.

3. The battery module according to claim 1, wherein the head of each of the first fastening members is provided with a depressed part, in which the head of a corresponding one of the second fastening members is located, and the fastening bar is provided at an inside of an upper end thereof with a wrenching bolt structure.

4. The battery module according to claim 3, wherein the depressed part is depressed by at least a height of the head of each of the second fastening members.

5. The battery module according to claim 2, wherein the head of each of the second fastening members is provided with a wrenching bolt structure.

6. The battery module according to claim 1, wherein the cartridges, the upper end plate, and the lower end plate are coupled to one another by inserting the first fastening members therethrough and then coupled to the module housing by fastening the second fastening members into the third fastening holes through the hollow parts.

7. The battery module according to claim 1, wherein the second fastening holes and the third fastening holes each are provided with a screw structure, into which the first fastening end of a corresponding one of the first fastening members and the second fastening end of a corresponding one of the second fastening members are threadedly engaged.

8. The battery module according to claim 1, wherein the first fastening members and the second fastening members each are made of a metal material.

9. The battery module according to claim 1, wherein the upper end plate and the lower end plate each are made of a metal material.

10. The battery module according to claim 1, wherein the cartridge is configured to have a rectangular structure corresponding to the battery cells such that the battery cells are mounted to the cartridge and is provided at four corners thereof with through holes, through which the first fastening members are inserted to fix the unit module stack.

11. The battery module according to claim 1, wherein each of the battery cells is a pouch-shaped battery cell having an electrode assembly mounted in a battery case made of a laminate sheet comprising a resin layer and a metal layer.

12. The battery module according to claim 11, wherein the laminate sheet is configured to have a structure comprising a thermally bondable inner resin layer, an isolation metal layer, and an outer resin layer exhibiting high durability.

13. A battery pack comprising two or more battery modules according to claim 1.

14. The battery pack according to claim 13, wherein the battery pack is used as a power source of an electric vehicle, a hybrid electric vehicle, a plug-in hybrid electric vehicle, or a power storage device.

\* \* \* \* \*